(12) United States Patent
Maughan

(10) Patent No.: US 6,269,545 B1
(45) Date of Patent: Aug. 7, 2001

(54) GAGE ASSEMBLY AND METHOD

(75) Inventor: Garth Maughan, Delta, OH (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/473,260

(22) Filed: Dec. 27, 1999

(51) Int. Cl.⁷ ...................................................... G01B 3/00
(52) U.S. Cl. .............................. 33/567; 33/549; 33/1 BB
(58) Field of Search .................................. 33/1 BB, 833, 33/501.05, 501.08, 501.09, 549, 567

(56) References Cited

U.S. PATENT DOCUMENTS

| 3,872,600 | * | 3/1975 | Siminsky | 33/501.45 |
| 4,364,179 | * | 12/1982 | Schiler et al. | 33/833 |

FOREIGN PATENT DOCUMENTS

0552340  *  4/1923  (FR) .

\* cited by examiner

*Primary Examiner*—Diego Gutierrez
*Assistant Examiner*—Madeline Gonzalez
(74) *Attorney, Agent, or Firm*—Rader, Fishman & Grauer PLLC

(57) ABSTRACT

A gage assembly is provided that is capable of simulating the functional environment of a molded component, such as a dust boot. The assembly includes a gage body, a collar unit, and a mating boss adapter. The collar unit includes a collar that is adapted to be secured to the gage body and is adapted to secure a specimen. The collar unit includes a stud having an upper portion and a lower portion, said stud being adapted to secure the specimen being inspected. The mating boss adapter is adapted to be installed over said collar unit and secure the specimen so that a portion of the collar unit and a portion of the mating boss adapter contact the specimen and simulate the intended functional environment of the specimen. A method for forming a gage assembly in accordance with the principles of the invention is also disclosed.

15 Claims, 4 Drawing Sheets

GAGE ASSEMBLY AND METHOD

FIELD OF THE INVENTION

The present invention generally relates to an inspection gage. More particularly, the present invention relates to a gage assembly that is suitable for inspecting compliant molded dust boots and/or seals. The present invention also includes a method for forming such an assembly.

BACKGROUND OF THE INVENTION

Traditional methods for dimensionally inspecting injection or compression molded dust boots or seals can be complex, time-consuming, and inefficient.

There therefore exists a need in industry for an inspection gage that can be formed in a simple and versatile manner to provide reliable, efficient and cost effective inspection of molded components. There further exists a need for a gage that is capable of simulating the intended environment for the molded component being inspected.

SUMMARY OF THE INVENTION

The present invention recognizes the current need to simplify the dimensional and functional inspection analysis of flexibly compliant components, such as dust boots or seals. The invention further recognizes the limitations associated with traditional dimensional inspection methods for injection molded and/or compression molded components and the need for a means of providing practical "real time" performance analysis regarding the same.

The present invention provides a gage assembly that is capable of simulating the functional environment of a molded component and providing efficient, inexpensive, and real time performance testing in a production or laboratory environment.

In accordance with an embodiment of the invention, a gage assembly is provided that is suitable for inspecting a molded specimen. The assembly includes a gage body, a collar unit, and a mating boss adapter. The collar unit includes a collar that is adapted to be secured to the gage body and to secure a specimen. The collar unit also includes a stud having an upper portion and a lower portion, the stud being adapted to secure the specimen being inspected. A mating boss adapter is adapted to be installed over the collar unit to secure the specimen so that a portion of the collar unit and a portion of the mating boss adapter contact the specimen and simulate the intended functional environment of the specimen. A method for forming a gage assembly in accordance with the principles of the invention is also disclosed.

BRIEF DESCRIPTIONS OF THE DRAWINGS

The features and inventive aspects of the present invention will become more apparent upon reading the following detailed description, claims, and drawings, of which the following is a brief description:

FIG. 3b is a top view of the bearing illustrated in FIG. 3a.

DETAILED DESCRIPTION OF PREFERRED EMBODIMENT

Figure 1:
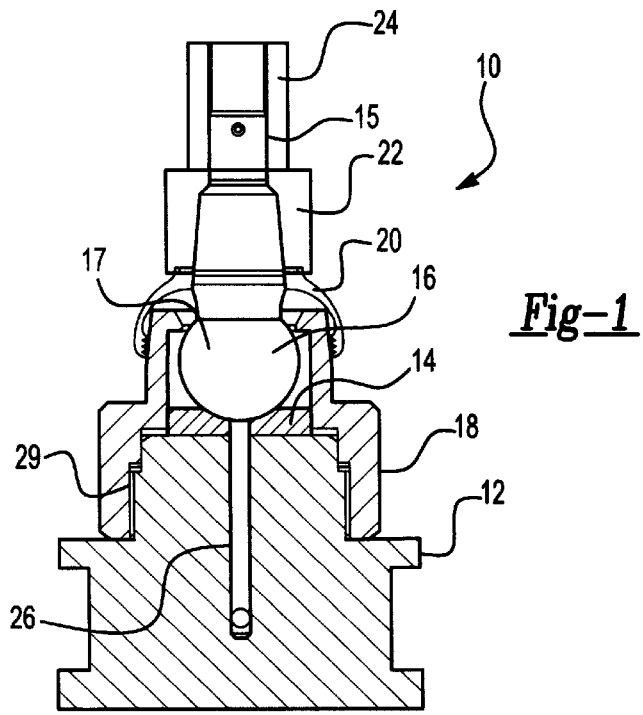
FIG. 1 is cross sectional view of an embodiment of the present invention.

Referring to FIG. 1, a cross sectional view of an embodiment of a gage assembly 10 formed in accordance with the principles of the present invention is shown. The illustrated assembly 10 includes a gage body 12, a bearing 14, a stud 16, a collar 18, a molded specimen 20, a mating boss adapter 22, and a locking member 24.

Figure 2A:
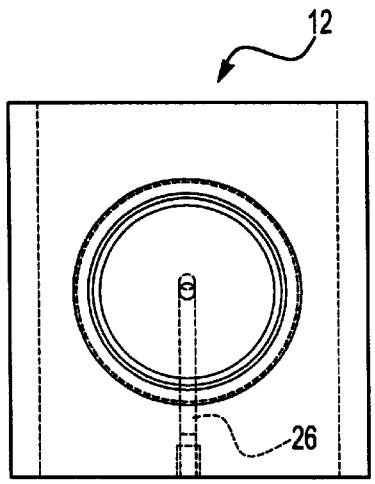
FIGS. 2a and 2b are a side view and a top view, respectively, of a gage body.
Figure 2B:
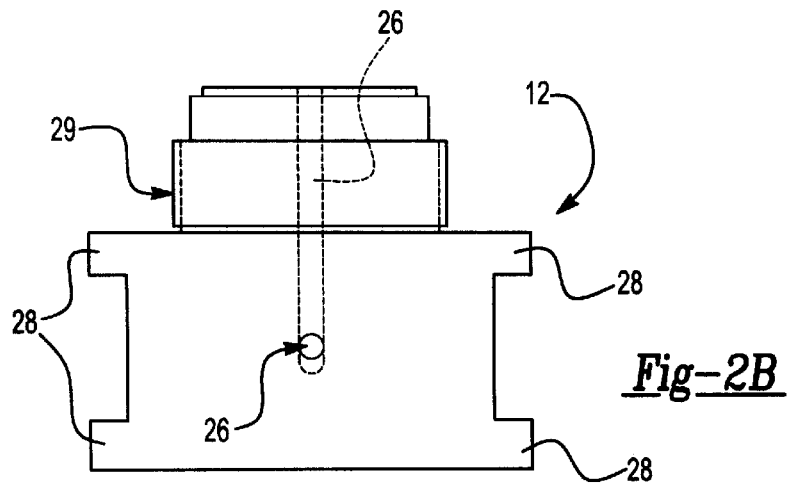

FIGS. 2a and 2b depict side and top view, respectively, of an embodiment of a gage body 12, including a grease channel 26. The body 12 is preferably comprised of tempered steel, however, the present invention is not limited to steel, and any number of other durable materials that can provide similar function and strength can be used to form the body 12. If desired, gage body ribs 28 and threads 29 can be included in the gage body 12. Features such as the ribs 28 can be used to help position and/or secure the gage body 12. For example, integral features of the gage body 12, such as the ribs 28, can be used to position and secure the body 12 in a conventional vice (not shown).

The form of the gage body 12 allows it to be easily secured in a conventional manner in a wide number of locations within traditional design, testing, and production environments. For instance, a conventional bench vice can be used to secure the gage body 12 and permit the tester to work the specimen 20 through its installed height compression and required articulations and wrap-up motions while the adaptive collars 18 simulate the exterior shape configuration features of the specimen's intended housing.

Figure 3A:
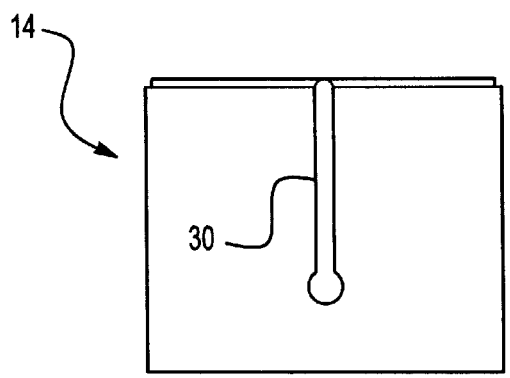
FIG. 3a is a side view of a bearing.
Figure 3B:
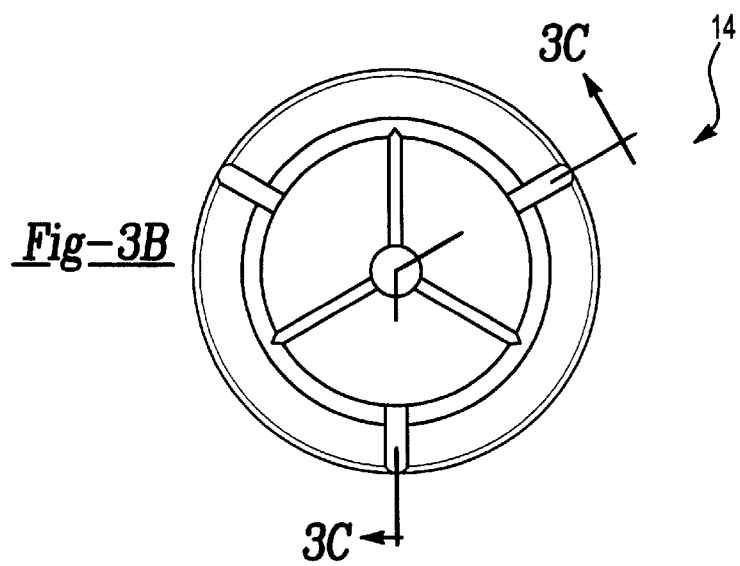
Figure 3C:
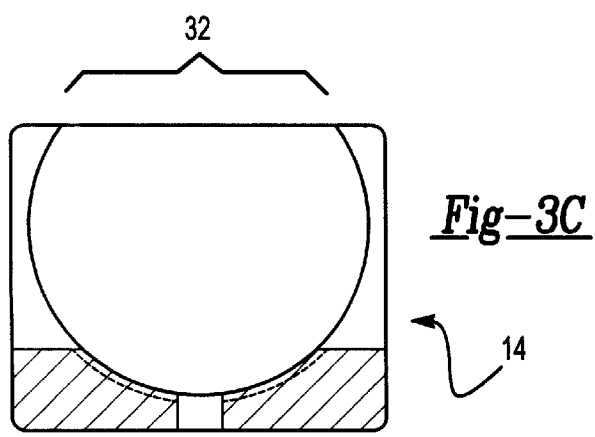
FIG. 3c is a section view of the bearing taken along section lines A–A shown in FIG. 3b.

FIGS. 3a to 3c illustrate three separate views of an embodiment of a bearing 14, which may also be referred to as an adaptive bearing. The bearing 14 is adapted to receive a stud 16, and preferably includes both a through wall 30 that is in communication with the grease channel 26 of the gage body 12 and a through opening 32. When the gage assembly 10 is assembled, such as shown in FIG. 1, a portion of the stud 16 preferably extends outwardly through and beyond the through opening 32 of the bearing 14. The bearing 14 is preferably comprised of a polymeric or elastomeric material, for example, without limitation, a 6—6 nylon with 2% molybdenum disulfide. However, the present invention is not limited to such a specific material, and any number of other durable materials that can provide similar function and strength can be used to form the bearing 14.

Figure 4A:
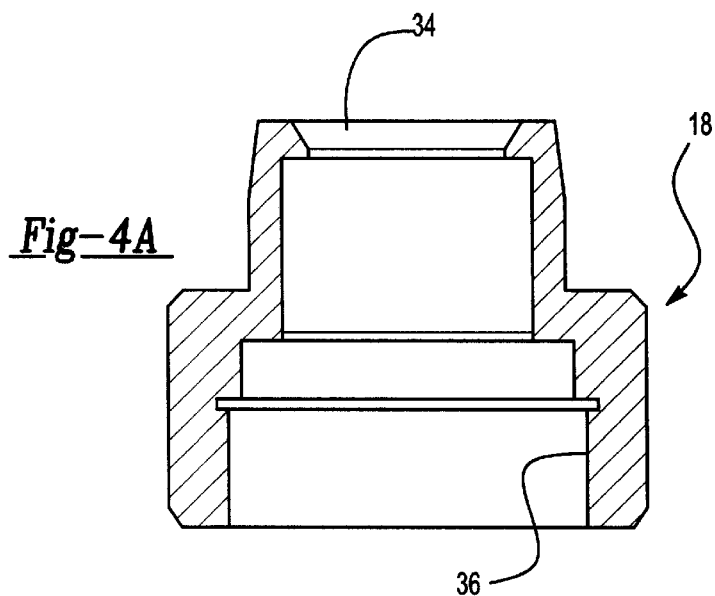
FIGS. 4a and 4b are a side elevational cross-section view and top view, respectively, of a collar.
Figure 4B:
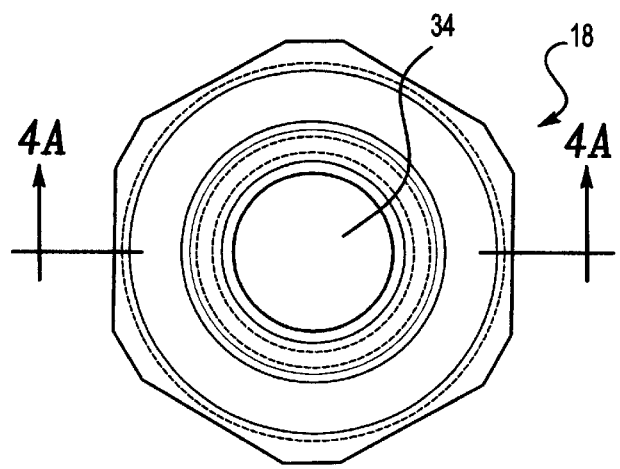

Turning next to FIGS. 4a and 4b, an adaptive collar 18 is shown. In a preferred embodiment of the present invention, the collar 18 is adapted to retain a stud 16. The adaptive collars provides the advantage of being easily replaceable, thus permitting the assembly 10 to simulate the features and/or functional environment for a much wider variety of inspection applications for different and unique specimens.

Figure 5:
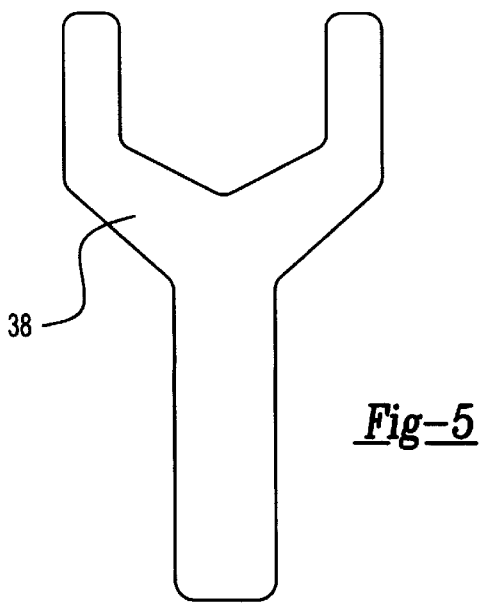
FIG. 5 is a front elevation view of an embodiment of a collar wrench.

The collar 18 includes an upper bearing opening 34 and preferably includes a securing means 36 for securing the collar 18 to the gage body 12. The securing means 36 may include, without limitation, a threaded portion that coacts with threads 29 of the gage body 12. In a preferred embodiment, the collar 18 is connected or attached directly to the threads 29 of the gage body 12, for example, by utilizing a collar wrench. An embodiment of a collar wrench 38 that can be used to secure a collar 18 to a threaded gage body is illustrated in FIG. 5.

Preferably, the collar 18 will generally duplicate or functionally represent the applicable features of the housing that the tested specimen is sought to interact with in service, for example to protect and/or seal. The collar 18 is preferably comprised of a hardened steel; however, the present invention is not limited to such a specific material, and any number of other durable materials that can provide similar function and strength can be used to form the collar 18.

Figure 6A:
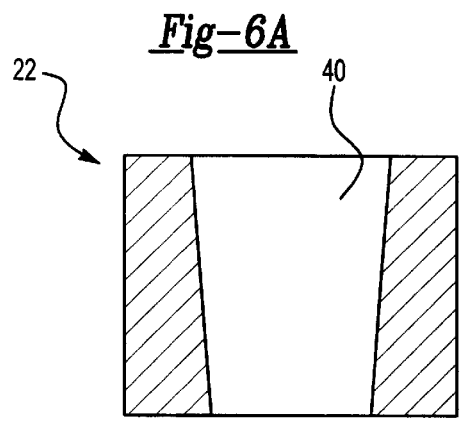
FIGS. 6a and 6b are a side elevational cross-section view and top view, respectively, of a mating boss adapter.
Figure 6B:
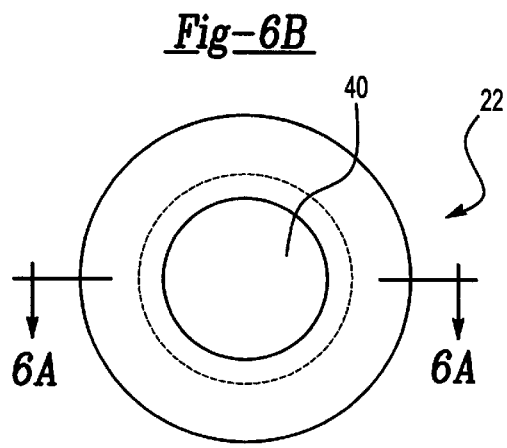

FIGS. 6a and 6b illustrate a preferred embodiment of a mating boss adapter 22 that can be used in connection with the present invention. As illustrated in the preferred embodiment shown in FIG. 1, when the assembly 10 is in an assembled condition to test a molded specimen 20, such as a conventional dust boot, the specimen 20 is installed over a stud 16 and a mating boss adapter 22 is installed over a portion of the stud 16 so as to cover and/or retain a portion of the specimen 20. Such an assembly allows for a high degree of visibility of virtually all of the exterior features of the specimen while it is being inspected and/or tested.

Preferably, the adapter 22 is tubular and includes a passage 40 that is generally adapted to be firmly positioned or fit over a portion of a stud 16 when the adapter 22 is in an assembled condition, such as shown in FIG. 1. The passage 40, which preferably extends through the adapter 22, may be straight-walled, or may have a tapered form such as illustrated in FIG. 6a. However, the adapter 22 can generally be more easily separated from the coacting portion of the corresponding stud 16 when a taper that increases in the "separation direction" (i.e., the direction moving upwardly and away from the gage body 12) is used.

Preferably, the mating boss adapter 22 will at least partially duplicate and/or functionally simulate the applicable features of the environment (e.g., housing) that the tested specimen is sought to interact with in service. The adapter 22 is preferably comprised of a hardened steel; however, the present invention is not limited to such a specific material, and any number of other durable materials that can provide similar function and strength can be used to form the adapter 22.

In a preferred embodiment of the assembly 10, a locking member 24 is used to secure the mating boss adapter 22 to the assembly 10, and most typically, the stud 16.

Figure 7A:
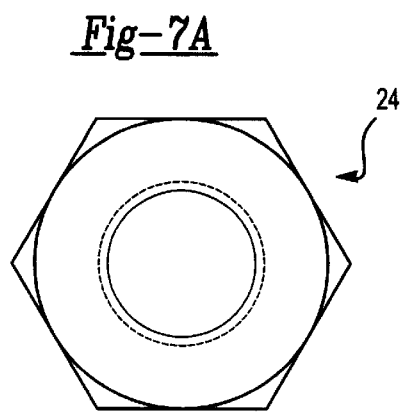
FIGS. 7a and 7b are aside elevational view and top view, respectively of a locking member.
Figure 7B:
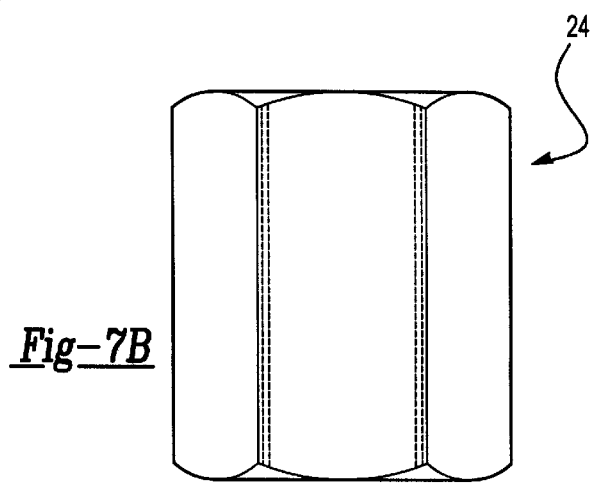

While a conventional extended hex nut is depicted in FIGS. 1, 7a and 7b, the precise type and form of locking member 24 is not critical to the practice of the present invention, and a number of conventional components may be used for such a purpose.

It is usually preferable to carefully position the adapter 22 so that it is properly connected to coact with the specimen being tested and then to generally secure the adapter 22 to the assembly 12 by a locking member 24. However, in another embodiment of the assembly 10, the aforementioned locking member 24 can be eliminated as a separate component and/or be integrally formed with, or connected to, the mating boss adapter 22.

A preferred method for forming a gage assembly in accordance with the present invention will now be described. It is to be noted that the individual steps do not necessarily have to include every functional step or be performed in the same order or sequence as hereinafter described.

First, a gage body 12 is provided. For most applications, the gage body 12 is preferably secured or connected to a solid physical support article. For example, a bench-type vice or other conventional means can be used to secure the gage body 12 or other component of the assembly 10. Further, ribs 28 or other physical features of the gage body 12 can be used to help position the gage body 12.

Preferably, the bearing surface of the adaptive bearing 14 is initially lubricated or greased. A stud 16 (adaptive or actual field component) having an upper portion 15 and lower portion 17 is installed or positioned into the mating receiving portion of the bearing 14, which is preferably adapted to receive at least a portion of the lower portion of the stud 16. The bearing 14 and stud 16 are then inserted into the adaptive collar 18, which is adapted to secure at least a portion of the bearing 14, so that at least a portion of the upper portion 15 of the stud 16 extends through or beyond the collar 18. The assembly of the bearing 14, stud, and collar 18 is commonly referred to as a "collar unit." The collar unit is positioned so as to be assembled to the gage body 12 and is generally secured or "locked" into place, for example, by using a collar wrench, although other conventional methods can be used to secure the collar unit to the gage body.

A specimen 20, which generally includes an opening, is installed over or around the stud 16 and is positioned against a portion of the surface of the collar 18. A mating boss adapter 22 is installed over the stud 16. Preferably, the mating boss adapter will gently seat on a tapered portion of the stud 16. In the preferred method, a locking means 24, such as an extended hex nut is installed on the stud 16 above the mating boss adapter 22 and is preferably finger-tightened so as not to inhibit subsequent disassembly and reconstruction.

A number of different types of specimens may be inspected and/or tested. For example, if the specimen 20 is a "sliding" type, a lubricant such as grease may be applied to the surface of the adaptive collar 18 until it is visible under the edge of the specimen. This can be accomplished, for example and without limitation, by using a manual operation, pump-type grease gun. If the specimen is a "press-on" or "clip-on" type, a lubricant or grease can be pumped into the grease channels of the gage until the lubricant or grease becomes visible at a purge hole on the specimen.

When the specimen 20 is appropriately lubricated or greased, it can now be inspected and/or tested as if the specimen 20 was actually installed on an intended article, such as a component of a vehicle being driven. This permits the person making the inspection to detect design and/or material or functional defects or faults. Such "functional" GO, NO-GO testing and analysis can be included in a statistical sampling to help determine manufacturing process capability.

Once the inspection and/or testing of a specimen is completed, the assembly 10 can be easily disassembled and the specimen removed. Thereafter, the assembly 10 may be appropriately configured and reassembled to test the same type or different type of specimen by selecting the appropriate adaptive assembly components.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A gage assembly suitable for inspecting a molded specimen, the gage assembly including:
   a gage body;
   a collar unit that includes a collar that is adapted to be secured to said gage body and is adapted to secure a specimen; and
   a mating boss adapter that is adapted to be installed over said collar unit and secure the specimen;
   wherein portions of said collar unit and said mating boss adapter contact the specimen and simulate the intended functional environment of the specimen.

2. A gage assembly as recited in claim 1, wherein said collar unit includes a stud having an upper portion and a lower portion, said stud being adapted to secure the specimen.

3. A gage assembly as recited in claim 2, wherein said lower portion of said stud is at least partially seated within said collar and at least a portion of said upper portion of said stud is connected to said boss adapter.

4. A gage assembly as recited in claim 2, wherein said collar unit includes a bearing adapted to seat a portion of said lower portion of said stud within said collar.

5. A gage assembly as recited in claim 2, wherein said upper portion of said stud includes a locking portion.

6. A gage assembly as recited in claim 5, wherein the assembly includes a locking member that is adapted to be secured to said locking portion.

7. A gage assembly as recited in claim 6, wherein said locking portion includes integral threads and said locking member includes a nut adapted to engage said threads.

8. A gage assembly suitable for inspecting a molded specimen, the gage assembly including:
   a gage body;
   a collar unit that includes a stud having an upper portion with a locking portion and a lower portion, a bearing adapted to receive said stud, and a collar that is adapted to be secured to said gage body to secure said bearing;
   a mating boss adapter that is adapted to be installed over said collar unit and secure the specimen; and
   a locking member that is adapted to be secured to said locking portion;
   wherein said lower portion of said stud is at least partially seated within said collar and at least a portion of said upper portion of said stud is connected to said boss adapter,
   wherein portions of said collar unit and said mating boss adapter contact the specimen and simulate the intended functional environment of the specimen.

9. A method for forming a gage assembly suitable for inspecting a molded specimen, said method including the steps of;
   providing a gage body;
   providing a stud having an upper and lower portion;
   providing a bearing adapted to receive the lower portion of the stud;
   assembling the bearing and the stud;
   providing a collar that is adapted to secure the bearing;
   inserting the stud and bearing into the collar so that a portion of the upper portion of the stud extends beyond the collar to thereby form a collar unit;
   assembling the collar unit to the gage body;
   providing a molded specimen;
   providing a mating boss adapter; and
   securing the specimen between the stud and the mating boss adapter.

10. A method as recited in claim 9, including the step of providing a securing means to secure the mating boss adapter.

11. A method as recited in claim 10, wherein the securing means is a nut.

12. A method as recited in claim 9, including the step of lubricating the bearing.

13. A method as recited in claim 9, wherein the gage body includes at least one channel in communication with the bearing, and the method includes the step of supplying lubricant to said bearing through said channel.

14. A method as recited in claim 9, including the step of supplying a lubricant to the collar.

15. A method as recited in claim 9, including the step of simulating the intended environment of the specimen being inspected.

* * * * *